US007302574B2

(12) United States Patent
Conwell et al.

(10) Patent No.: US 7,302,574 B2
(45) Date of Patent: Nov. 27, 2007

(54) CONTENT IDENTIFIERS TRIGGERING CORRESPONDING RESPONSES THROUGH COLLABORATIVE PROCESSING

(75) Inventors: William Y. Conwell, Portland, OR (US); Brett A. Bradley, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 655 days.

(21) Appl. No.: 09/888,339

(22) Filed: Jun. 21, 2001

(65) Prior Publication Data

US 2002/0028000 A1 Mar. 7, 2002

Related U.S. Application Data

(63) Continuation-in-part of application No. 09/858,189, filed on May 14, 2001, which is a continuation-in-part of application No. 09/571,422, filed on May 15, 2000, now Pat. No. 6,947,571, and a continuation-in-part of application No. 09/552,998, filed on Apr. 19, 2000, now abandoned, and a continuation-in-part of application No. 09/547,664, filed on Apr. 12, 2000, and a continuation-in-part of application No. 09/543,125, filed on Apr. 5, 2000, and a continuation-in-part of application No. 09/531,076, filed on Mar. 18, 2000, and a continuation-in-part of application No. 09/342,689, filed on Jun. 29, 1999, now Pat. No. 6,311,214, and a continuation-in-part of application No. 09/343,104, filed on Jun. 29, 1999, now abandoned, and a continuation-in-part of application No. 09/343,101, filed on Jun. 29, 1999, now abandoned, and a continuation-in-part of application No. 09/342,971, filed on Jun. 29, 1999, now abandoned, and a continuation-in-part of application No. 09/342,688, filed on Jun. 29, 1999, now Pat. No. 6,650,761, and a continuation-in-part of application No. 09/314,648, filed on May 19, 1999, now Pat. No. 6,681,028.

(60) Provisional application No. 60/164,619, filed on Nov. 10, 1999, provisional application No. 60/163,332, filed on Nov. 3, 1999, provisional application No. 60/158,015, filed on Oct. 6, 1999, provisional application No. 60/151,586, filed on Aug. 30, 1999, provisional application No. 60/141,468, filed on Jun. 29, 1999.

(51) Int. Cl.
H04L 9/00 (2006.01)

(52) U.S. Cl. ...................... 713/176; 713/161

(58) Field of Classification Search ........ 380/200–204, 380/217, 229, 236–238, 247, 270, 54; 713/176, 713/200–201, 161; 705/51, 57–59; 382/100, 382/115–119, 124; 726/27, 30–32
See application file for complete search history.

(56) References Cited

U.S. PATENT DOCUMENTS

| 3,810,156 | A | 5/1974 | Goldman |
| 3,919,479 | A | 11/1975 | Moon et al. |
| 4,071,698 | A | 1/1978 | Barger, Jr. et al. |
| 4,230,990 | A | 10/1980 | Lert, Jr. et al. |
| 4,284,846 | A | 8/1981 | Marley |
| 4,432,096 | A | 2/1984 | Bunge |
| 4,450,531 | A | 5/1984 | Kenyon et al. |
| 4,495,526 | A | 1/1985 | Baranoff-Rossine |
| 4,499,601 | A | 2/1985 | Matthews |
| 4,511,917 | A | 4/1985 | Kohler et al. |
| 4,547,804 | A | 10/1985 | Greenberg |
| 4,677,466 | A | 6/1987 | Lert, Jr. et al. |
| 4,682,370 | A | 7/1987 | Matthews |
| 4,697,209 | A | 9/1987 | Kiewit et al. |
| 4,739,398 | A | 4/1988 | Thomas et al. |
| 4,776,017 | A | 10/1988 | Fujimoto |
| 4,807,031 | A | 2/1989 | Broughton et al. |
| 4,843,562 | A | 6/1989 | Kenyon et al. |
| 4,858,000 | A | 8/1989 | Lu |
| 4,945,412 | A | 7/1990 | Kramer |
| 4,972,471 | A | 11/1990 | Gross |
| 5,019,899 | A | 5/1991 | Boles et al. |
| 5,031,228 | A | 7/1991 | Lu |
| 5,276,629 | A | 1/1994 | Reynolds |
| 5,303,393 | A | 4/1994 | Noreen et al. |

(Continued)

FOREIGN PATENT DOCUMENTS

EP 161512 11/1985

(Continued)

OTHER PUBLICATIONS

Cognicity, Inc. Initial Offer in Response to Secure Digital Music Initiative CfP for Phase II Screening Technology submission 2, Apr. 24, 2000.

(Continued)

Primary Examiner—Hosuk Song

(57) ABSTRACT

Fingerprint data derived from audio or other content is used as an identifier. The fingerprint data can be derived from the content. In one embodiment, fingerprint data supplied from two or more sources is aggregated. The aggregated fingerprint data is used to define a set of audio signals. An audio signal from the set of audio signals is selected based on its probability of matching the fingerprint data. Digital watermarks can also be similarly used to define a set of audio signals.

23 Claims, No Drawings

U.S. PATENT DOCUMENTS

| | | | |
|---|---|---|---|
| 5,400,261 A | 3/1995 | Reynolds | |
| 5,436,653 A * | 7/1995 | Ellis et al. .................... | 725/22 |
| 5,437,050 A | 7/1995 | Lamb et al. | |
| 5,481,294 A | 1/1996 | Thomas et al. | |
| 5,486,686 A | 1/1996 | Zdybel, Jr. et al. | |
| 5,499,294 A | 2/1996 | Friedman | |
| 5,504,518 A | 4/1996 | Ellis et al. | |
| 5,539,635 A | 7/1996 | Larson, Jr. | |
| 5,564,073 A | 10/1996 | Takahisa | |
| 5,572,246 A | 11/1996 | Ellis et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,577,249 A | 11/1996 | Califano | |
| 5,577,266 A | 11/1996 | Takahisa et al. | |
| 5,579,124 A | 11/1996 | Aijala et al. | |
| 5,581,658 A | 12/1996 | O'Hagan et al. | |
| 5,581,800 A | 12/1996 | Fardeau et al. | |
| 5,584,070 A | 12/1996 | Harris et al. | |
| 5,612,729 A | 3/1997 | Ellis et al. | |
| 5,613,004 A | 3/1997 | Cooperman et al. | |
| 5,621,454 A | 4/1997 | Ellis et al. | |
| 5,638,443 A | 6/1997 | Stefik et al. | |
| 5,640,193 A | 6/1997 | Wellner | |
| 5,646,997 A | 7/1997 | Barton | |
| 5,661,787 A | 8/1997 | Pocock | |
| 5,663,766 A | 9/1997 | Sizer, II | |
| 5,664,018 A | 9/1997 | Leighton | |
| 5,671,267 A | 9/1997 | August et al. | |
| 5,687,236 A | 11/1997 | Moskowitz et al. | |
| 5,708,478 A | 1/1998 | Tognazzini | |
| 5,737,025 A | 4/1998 | Dougherty et al. | |
| 5,740,244 A | 4/1998 | Indeck | |
| 5,751,854 A | 5/1998 | Saitoh et al. | |
| 5,761,606 A | 6/1998 | Wolzien | |
| 5,765,152 A | 6/1998 | Erickson | |
| 5,765,176 A | 6/1998 | Bloomberg | |
| 5,768,426 A | 6/1998 | Rhoads | |
| 5,774,452 A | 6/1998 | Wolosewicz | |
| 5,774,666 A | 6/1998 | Portuesi | |
| 5,778,192 A | 7/1998 | Schuster et al. | |
| 5,781,629 A | 7/1998 | Haber et al. | |
| 5,781,914 A | 7/1998 | Stork et al. | |
| 5,832,119 A | 11/1998 | Rhoads | |
| 5,841,978 A | 11/1998 | Rhoads | |
| 5,842,162 A | 11/1998 | Fineberg | |
| 5,862,260 A | 1/1999 | Rhoads | |
| 5,889,868 A | 3/1999 | Moskowitz et al. | |
| 5,892,900 A | 4/1999 | Ginter et al. | |
| 5,893,095 A | 4/1999 | Jain et al. | |
| 5,901,224 A | 5/1999 | Hecht | |
| 5,902,353 A | 5/1999 | Reber et al. | |
| 5,903,892 A | 5/1999 | Hoffert et al. | |
| 5,905,248 A | 5/1999 | Russell et al. | |
| 5,905,800 A | 5/1999 | Moskowitz et al. | |
| 5,918,223 A | 6/1999 | Blum et al. | |
| 5,930,369 A | 7/1999 | Cox et al. | |
| 5,932,863 A | 8/1999 | Rathus | |
| 5,938,727 A | 8/1999 | Ikeda | |
| 5,943,422 A | 8/1999 | Van Wie et al. | |
| 5,978,791 A | 11/1999 | Farber et al. | |
| 5,982,956 A | 11/1999 | Lahmi | |
| 5,983,176 A | 11/1999 | Hoffert et al. | |
| 5,986,651 A | 11/1999 | Reber et al. | |
| 5,986,692 A | 11/1999 | Logan et al. | |
| 5,991,500 A | 11/1999 | Kanota et al. | |
| 5,991,737 A | 11/1999 | Chen | |
| 5,995,105 A | 11/1999 | Reber et al. | |
| 6,028,960 A | 2/2000 | Graf et al. | |
| 6,037,984 A | 3/2000 | Isnardi et al. | |
| 6,041,411 A * | 3/2000 | Wyatt ........................ | 713/200 |
| 6,064,764 A | 5/2000 | Bhaskaran et al. | |
| 6,081,629 A | 6/2000 | Browning | |
| 6,081,827 A | 6/2000 | Reber et al. | |
| 6,081,830 A | 6/2000 | Schindler | |
| 6,084,528 A | 7/2000 | Beach et al. | |
| 6,088,455 A | 7/2000 | Logan et al. | |
| 6,121,530 A | 9/2000 | Sonoda | |
| 6,122,403 A | 9/2000 | Rhoads | |
| 6,131,162 A | 10/2000 | Yoshiura et al. | |
| 6,138,151 A | 10/2000 | Reber et al. | |
| 6,148,407 A * | 11/2000 | Aucsmith .................... | 713/202 |
| 6,157,721 A | 12/2000 | Shear et al. | |
| 6,164,534 A | 12/2000 | Rathus et al. | |
| 6,169,541 B1 | 1/2001 | Smith | |
| 6,181,817 B1 | 1/2001 | Zabih | |
| 6,185,316 B1 | 2/2001 | Buffam | |
| 6,185,318 B1 * | 2/2001 | Jain et al. .................... | 382/125 |
| 6,188,010 B1 | 2/2001 | Iwamura | |
| 6,199,048 B1 | 3/2001 | Hudetz et al. | |
| 6,201,879 B1 | 3/2001 | Bender et al. | |
| 6,219,787 B1 | 4/2001 | Brewer | |
| 6,219,793 B1 * | 4/2001 | Li et al. ..................... | 713/202 |
| 6,226,618 B1 | 5/2001 | Downs et al. | |
| 6,226,672 B1 * | 5/2001 | DeMartin et al. ........... | 709/219 |
| 6,243,480 B1 | 6/2001 | Zhao et al. | |
| 6,282,362 B1 | 8/2001 | Murphy et al. | |
| 6,286,036 B1 | 9/2001 | Rhoads | |
| 6,292,092 B1 | 9/2001 | Chow et al. | |
| 6,304,523 B1 | 10/2001 | Jones et al. | |
| 6,311,214 B1 | 10/2001 | Rhoads | |
| 6,314,457 B1 | 11/2001 | Schena et al. | |
| 6,314,518 B1 | 11/2001 | Linnartz | |
| 6,317,881 B1 | 11/2001 | Shah-Nazaroff et al. | |
| 6,321,981 B1 | 11/2001 | Ray | |
| 6,321,992 B1 | 11/2001 | Knowles et al. | |
| 6,324,573 B1 | 11/2001 | Rhoads | |
| 6,345,104 B1 | 2/2002 | Rhoads | |
| 6,386,453 B1 | 5/2002 | Russell et al. | |
| 6,389,055 B1 | 5/2002 | August et al. | |
| 6,408,331 B1 | 6/2002 | Rhoads | |
| 6,411,725 B1 | 6/2002 | Rhoads | |
| 6,415,280 B1 | 7/2002 | Farber et al. | |
| 6,433,946 B2 | 8/2002 | Ogino | |
| 6,434,403 B1 | 8/2002 | Ausems et al. | |
| 6,434,561 B1 | 8/2002 | Durst, Jr. et al. | |
| 6,439,465 B1 | 8/2002 | Bloomberg | |
| 6,466,670 B1 | 10/2002 | Tsuria et al. | |
| 6,496,802 B1 | 12/2002 | van Zoest et al. | |
| 6,504,940 B2 | 1/2003 | Omata et al. | |
| 6,505,160 B1 | 1/2003 | Levy | |
| 6,522,769 B1 | 2/2003 | Rhoads et al. | |
| 6,523,175 B1 | 2/2003 | Chan | |
| 6,526,449 B1 | 2/2003 | Philyaw et al. | |
| 6,542,927 B2 | 4/2003 | Rhoads | |
| 6,542,933 B1 | 4/2003 | Durst, Jr. et al. | |
| 6,553,129 B1 | 4/2003 | Rhoads | |
| 6,577,746 B1 | 6/2003 | Evans et al. | |
| 6,604,072 B2 | 8/2003 | Pitman et al. | |
| 6,611,599 B2 | 8/2003 | Natarajan | |
| 6,614,914 B1 | 9/2003 | Rhoads et al. | |
| 6,625,295 B1 | 9/2003 | Wolfgang et al. | |
| 6,658,568 B1 | 12/2003 | Ginter et al. | |
| 6,671,407 B1 | 12/2003 | Venkatesan et al. | |
| 6,674,876 B1 | 1/2004 | Hannigan et al. | |
| 6,674,993 B1 | 1/2004 | Tarbouriech | |
| 6,681,028 B2 | 1/2004 | Rodriguez et al. | |
| 6,697,948 B1 * | 2/2004 | Rabin et al. ................ | 713/200 |
| 6,735,311 B1 * | 5/2004 | Rump et al. ................ | 380/231 |
| 6,748,360 B2 | 6/2004 | Pitman | |
| 6,748,533 B1 | 6/2004 | Wu | |
| 6,751,336 B2 | 6/2004 | Zhao | |
| 6,754,822 B1 | 6/2004 | Zhao | |
| 6,768,980 B1 | 7/2004 | Meyer et al. | |

| | | |
|---|---|---|
| 6,771,885 B1 | 8/2004 | Agnihotri |
| 6,772,124 B2 | 8/2004 | Hoffberg et al. |
| 6,785,815 B1 | 8/2004 | Serret-Avila et al. |
| 6,807,534 B1 | 10/2004 | Erickson |
| 6,829,368 B2 | 12/2004 | Meyer et al. |
| 6,834,308 B1 | 12/2004 | Ikezoye et al. |
| 6,850,252 B1 | 2/2005 | Hoffberg |
| 6,856,977 B1 | 2/2005 | Adelsbach |
| 6,931,451 B1 | 8/2005 | Logan et al. |
| 6,941,275 B1 | 9/2005 | Swierczek |
| 6,947,571 B1 | 9/2005 | Rhoads et al. |
| 6,968,337 B2 | 11/2005 | Wold |
| 6,973,574 B2 | 12/2005 | Mihcak et al. |
| 6,973,669 B2 | 12/2005 | Daniels |
| 6,987,862 B2 | 1/2006 | Rhoads |
| 6,990,453 B2 | 1/2006 | Wang |
| 7,047,413 B2 | 5/2006 | Yacobi et al. |
| 7,050,603 B2 | 5/2006 | Rhoads et al. |
| 7,055,034 B1 | 5/2006 | Levy |
| 7,058,697 B2 | 6/2006 | Rhoads |
| 7,127,744 B2 | 10/2006 | Levy |
| 2001/0007130 A1 | 7/2001 | Takaragi |
| 2001/0011233 A1 | 8/2001 | Narayanaswami |
| 2001/0026618 A1 | 10/2001 | Van Wie et al. |
| 2001/0026629 A1 | 10/2001 | Oki |
| 2001/0031066 A1 | 10/2001 | Meyer et al. |
| 2001/0032312 A1 | 10/2001 | Runje et al. |
| 2001/0044824 A1 | 11/2001 | Hunter et al. |
| 2001/0046307 A1 | 11/2001 | Wong |
| 2001/0055391 A1 | 12/2001 | Jacobs |
| 2002/0010826 A1 | 1/2002 | Takahashi et al. |
| 2002/0021805 A1 | 2/2002 | Schumann et al. |
| 2002/0021822 A1 | 2/2002 | Maeno |
| 2002/0023020 A1 | 2/2002 | Kenyon et al. |
| 2002/0023148 A1 | 2/2002 | Ritz et al. |
| 2002/0023218 A1 | 2/2002 | Lawandy et al. |
| 2002/0028000 A1 | 3/2002 | Conwell et al. |
| 2002/0032698 A1 | 3/2002 | Cox |
| 2002/0032864 A1 | 3/2002 | Rhoads |
| 2002/0037083 A1 | 3/2002 | Weare et al. |
| 2002/0040433 A1 | 4/2002 | Kondo |
| 2002/0044659 A1 | 4/2002 | Ohta |
| 2002/0048224 A1 | 4/2002 | Dygert |
| 2002/0052885 A1 | 5/2002 | Levy |
| 2002/0059208 A1 | 5/2002 | Abe |
| 2002/0059580 A1 | 5/2002 | Kalker et al. |
| 2002/0068987 A1 | 6/2002 | Hars |
| 2002/0069107 A1 | 6/2002 | Werner |
| 2002/0072982 A1 | 6/2002 | Van de Sluis |
| 2002/0072989 A1 | 6/2002 | Van de Sluis |
| 2002/0075298 A1 | 6/2002 | Schena et al. |
| 2002/0082731 A1 | 6/2002 | Pitman et al. |
| 2002/0083123 A1 | 6/2002 | Freedman et al. |
| 2002/0087885 A1 | 7/2002 | Peled et al. |
| 2002/0088336 A1 | 7/2002 | Stahl |
| 2002/0099555 A1 | 7/2002 | Pitman et al. |
| 2002/0102966 A1 | 8/2002 | Lev et al. |
| 2002/0118864 A1 | 8/2002 | Kondo et al. |
| 2002/0126872 A1 | 9/2002 | Brunk |
| 2002/0133499 A1 | 9/2002 | Ward et al. |
| 2002/0138744 A1 | 9/2002 | Schleicher et al. |
| 2002/0150165 A1 | 10/2002 | Huizer |
| 2002/0152388 A1 | 10/2002 | Linnartz et al. |
| 2002/0153661 A1 | 10/2002 | Brooks et al. |
| 2002/0161741 A1 | 10/2002 | Wang et al. |
| 2002/0168082 A1 | 11/2002 | Razdan |
| 2002/0172394 A1 | 11/2002 | Venkatesan et al. |
| 2002/0174431 A1 | 11/2002 | Bowman et al. |
| 2002/0178410 A1 | 11/2002 | Haitsma et al. |
| 2002/0184505 A1 | 12/2002 | Mihcak et al. |
| 2002/0188840 A1 | 12/2002 | Echizen |
| 2002/0196976 A1 | 12/2002 | Venkatesan |
| 2002/0199106 A1 | 12/2002 | Hayashi |
| 2003/0018709 A1 | 1/2003 | Schrempp et al. |
| 2003/0028796 A1 | 2/2003 | Roberts et al. |
| 2003/0037010 A1 | 2/2003 | Schmelzer |
| 2003/0051252 A1 | 3/2003 | Miyaoku |
| 2003/0101162 A1 | 5/2003 | Thompson et al. |
| 2003/0120679 A1 | 6/2003 | Kriechbaum et al. |
| 2003/0135623 A1 | 7/2003 | Schrempp et al. |
| 2003/0167173 A1 | 9/2003 | Levy et al. |
| 2003/0174861 A1 | 9/2003 | Levy et al. |
| 2003/0197054 A1 | 10/2003 | Eunson |
| 2004/0049540 A1 | 3/2004 | Wood |
| 2004/0145661 A1 | 7/2004 | Murakami et al. |
| 2004/0169892 A1 | 9/2004 | Yoda |
| 2004/0201676 A1 | 10/2004 | Needham |
| 2004/0223626 A1 | 11/2004 | Honsinger et al. |
| 2005/0043018 A1 | 2/2005 | Kawamoto |
| 2005/0044189 A1 | 2/2005 | Ikezoye et al. |
| 2005/0058319 A1 | 3/2005 | Rhoads et al. |
| 2005/0091268 A1 | 4/2005 | Meyer et al. |
| 2005/0108242 A1 | 5/2005 | Kalker et al. |
| 2005/0144455 A1 | 6/2005 | Haitsma |
| 2005/0229107 A1 | 10/2005 | Hull et al. |
| 2005/0267817 A1 | 12/2005 | Barton et al. |

FOREIGN PATENT DOCUMENTS

| | | |
|---|---|---|
| EP | 493091 | 7/1992 |
| EP | 953938 | 11/1999 |
| EP | 0967803 | 12/1999 |
| EP | 1173001 | 1/2002 |
| EP | 1199878 | 4/2002 |
| JP | 11265396 | 9/1999 |
| WO | WO98/03923 | 1/1998 |
| WO | WO99/35809 | 7/1999 |
| WO | 9959275 | 11/1999 |
| WO | WO00/58940 | 10/2000 |
| WO | WO00/79709 | 12/2000 |
| WO | WO0106703 | 1/2001 |
| WO | WO01/15021 | 3/2001 |
| WO | WO01/20483 | 3/2001 |
| WO | WO01/20609 | 3/2001 |
| WO | WO0115021 | 3/2001 |
| WO | WO01/62004 | 8/2001 |
| WO | WO01/71517 | 9/2001 |
| WO | WO0172030 | 9/2001 |
| WO | 0175794 | 10/2001 |
| WO | WO01/75629 | 10/2001 |
| WO | WO02/11123 | 2/2002 |
| WO | WO0211123 | 2/2002 |
| WO | WO0219589 | 3/2002 |
| WO | WO02/27600 | 4/2002 |
| WO | WO0227600 | 4/2002 |
| WO | 02082271 | 10/2002 |

OTHER PUBLICATIONS

Cognicity's Response to Secure Digital Music Initiative CfP for Phase II Screening Technology. Submission 2, Jun. 18, 2000.
Cognicity's Phase II Screening Technology: Non Watermarking Solution, Powerpoint presentation, Jun. 26, 2000.
U.S. Appl. No. 60/232,618, filed Sep. 14, 2000, Cox.
U.S. Appl. No. 09/511,632, filed Feb. 11, 2000, Ikezoye et al.
U.S. Appl. No. 60/257,822, filed Dec. 21, 2000, Aggson et al.
U.S. Appl. No. 60/263,490, filed Jan. 22, 2001, Brunk et al.
U.S. Appl. No. 60/175,159, filed Jan. 7, 2000, Derose et al.
U.S. Appl. No. 60/178,028, filed Jan. 26, 2000, Meyer et al.
Lin, et al., "Generating Robust Digital Signature for Image/Video Authentication," Proc. Multimedia and Security workshop at ACM Multimedia'98, Sep. 1, 1998, pp. 49-54.
Ghias et al, Query by Humming: Musical Information Retrieval In An Audio Database. In ACM Multimedia, pp. 231-236, Nov. 1995.
Kageyama et al, Melody Retrieval with Humming, Proceedings of Int. Computer Music Conference (ICMC), 1993.

Muscle Fish press release, Muscle Fish's Audio Search Technology to be Encapsulated into Informix Datablade Module, Jul. 10, 1996.

Wold et al, Content-Based Classification, Search, and Retrieval of Audio, IEEE Multimedia Magazine, Fall, 1996.

Wired News, MP3.com Stores Your CDs, Wired News Report, www.wired.com/news/technology\0,1282,33524,00.html, Jan. 12, 2000.

Oct. 19, 2005 final Office Action, Jan. 24, 2006 Amendment After Final, and Feb. 21, 2006 Advisory Action, each from assignee's U.S. Appl. No. 09/888,339 (published as US 2002-0028000 A1).

Jan. 26, 2005 Amendment and Sep. 9, 2005 Notice of Allowance, each from assignee's U.S. Appl. No. 09/404,291.

* cited by examiner

CONTENT IDENTIFIERS TRIGGERING CORRESPONDING RESPONSES THROUGH COLLABORATIVE PROCESSING

RELATED APPLICATION DATA

This application is a continuation-in-part of application Ser. No. 09/858,189, filed May 14, 2001, which is a continuation in part of application Ser. No. 09/571,422, filed May 15, 2000 now U.S. Pat. No. 6,947,571. Application Ser. No. 09/571,422 claims priority benefit to each of the following provisional applications: Ser. No. 60/141,468, filed Jun. 29, 1999; Ser. No. 60/151,586, filed Aug. 30, 1999; Ser. No 60/158,015, filed Oct. 6, 1999; Ser. No. 60/163,332, filed Nov. 3, 1999; and Ser. No. 60/164,619, filed Nov. 10, 1999. Application Ser. No. 09/571,422 is also a continuation-in-part of each of the following utility applications: Ser. No. 09/314,648, filed May 19, 1999 now U.S. Pat. No. 6,681,028; Ser. No. 09/342,688, filed Jun. 29, 1999 now U.S. Pat. No. 6,650,761; Ser. No. 09/342,689, filed Jun. 29, 1999 now U.S. Pat. No. 6,311,214; Ser. No. 09/342,971, filed Jun. 29, 1999 now abandoned; Ser. No. 09/343,101, filed Jun. 29, 1999 now abandoned; Ser. No. 09/343,104, filed Jun. 29, 1999 now abandoned; Ser. No. 09/531,076, filed Mar. 18, 2000; Ser. No. 09/543,125, filed Apr. 5, 2000; Ser. No. 09/547,664, filed Apr. 12, 2000; and Ser. No. 09/552,998, filed Apr. 19, 2000 now abandoned.

This application is also a continuation-in-part of copending application Ser. Nos. 09/574,726 and 09/476,686, both of which claim priority to application Ser. No. 60/134,782.

The present application claims priority benefit to the foregoing applications.

The subject matter of this application is also related to that of Ser. Nos. 09/620,019, 60/257,822, 60/232,163, and 09/404,291.

FIELD OF THE INVENTION

The present invention relates to computer-based systems, and more particularly relates to systems that identify electronic or physical objects (e.g., audio, printed documents, video, etc.), and trigger corresponding responses.

BACKGROUND

In application Ser. No. 09/571,422 (now laid-open as PCT publication WO 00/70585), the present assignee described technology that can sense an object identifier from a physical or electronic object, and trigger a corresponding computer response.

In applications Ser. Nos. 09/574,726 and 09/476,686, the present assignee described technology that uses a microphone to sense audio sounds, determine an identifier corresponding to the audio, and then trigger a corresponding response.

DETAILED DESCRIPTION

Although the cited patent applications focused on use of digital watermarks to identify the subject objects/audio, they noted that the same applications and benefits can be provided with other identification technologies.

One such suitable technology—variously known as robust hashing, fingerprinting, etc.—involves generating an identifier from attributes of the content. This identifier can then be looked-up in a database (or other data structure) to determine the song (or other audio track) to which it corresponds.

Various fingerprinting technologies are known. For example, a software program called TRM, from Relatable Software, was written up in the Washington Post as follows:

TRM performs a small technological miracle: It "fingerprints" songs, analyzing beat and tempo to generate a unique digital identifier. Since every song is slightly different, no two "acoustic fingerprints" are alike, not even live and studio versions of the same melody.

Tuneprint is another such audio fingerprinting tool. Tuneprint is understood to utilize a model of human hearing used to predict how audio will appear after it's been distorted by the human ear, and the parts of neural processing that are understood. This is some of the same information that led to MP3 encoders achieving exceptional audio compression. Characteristics that uniquely identify the track are then identified by picking out the most important, surprising, or significant features of the sound.

Yet another fingerprinting program is Songprint, available as an open source library from freetantrum.org.

Still other fingerprinting technologies are available from Cantametrix (see, e.g., published patent applications WO01/20483 and WO01/20609).

One particular approach to fingerprinting is detailed in the present assignee's application Ser. No. 60/263,490, filed Jan. 22, 2001.

One form of fingerprint may be derived by applying content—in whole or part, and represented in time- or frequency format—to a neural network, such as a Kohonen self-organizing map. For example, a song may be identified by feeding the first 30 seconds of audio, with 20 millisecond Fourier transformed windows, into a Kohonen network having 64 outputs. The 64 outputs can, themselves, form the fingerprint, or they can be further processed to yield the fingerprint.

A variety of other fingerprinting tools and techniques are known to artisans in the field. Others are disclosed, e.g., in applications Ser. Nos. 60/257,822, 09/563,664, and 09/578,551. See also the chapter on Fingerprinting by John Hyeon Lee, in *Information Hiding: Techniques for Stenography and Digital Watermarking* edited by Stefan Katzenbeisse and Fabien A. P. Petitcolas, published by Artech House.

One way to generate a fingerprint is to "hash" the audio, to derive a shorter code that is dependent, in a predetermined way, on the audio data. However, slight differences in the audio data (such as sampling rate) can cause two versions of the same song to yield two different hash codes. While this outcome is advantageous in certain outcomes, it is disadvantageous in many others.

Generally preferable are audio fingerprinting techniques that yield the same fingerprints, even if the audio data are slightly different. Thus, a song sampled at a 96K bit rate desirably should yield the same fingerprint as the same song sampled at 128K. Likewise, a song embedded with steganographic watermark data should generally yield the same fingerprint as the same song without embedded watermark data.

One way to do this is to employ a hash function that is insensitive to certain changes in the input data. Thus, two audio tracks that are acoustically similar will hash to the same code, notwithstanding the fact that individual bits are different. A variety of such hashing techniques are known.

Another approach does not rely on "hashing" of the audio data bits. Instead, the audio is decomposed into elements having greater or lesser perceptibility. Audio compression techniques employ such decomposition methods, and discard the elements that are essentially imperceptible. In fingerprinting, these elements can also be disregarded, and the "fingerprint" taken from the acoustically significant portions of the audio (e.g., the most significant coefficients after transformation of the audio into a transform domain, such as DCT).

Some fingerprinting techniques do not rely on the absolute audio data (or transformed data) per se, but rather rely on the changes in such data from sample to sample (or coefficient to coefficient) as an identifying hallmark of the audio.

Some fingerprinting algorithms consider the entire audio track (e.g., 3 minutes). Others work on much shorter windows—a few seconds, or fractions of seconds. The former technique yields a single fingerprint for the track. The latter yields plural fingerprints—one from each excerpt. (The latter fingerprints can be concatenated, or otherwise combined, to yield a master fingerprint for the entire audio track.) For compressed audio, one convenient unit from which excerpts can be formed is the frame or window used in the compression algorithm (e.g., the excerpt can be one frame, five frames, etc.).

One advantage to the excerpt-based techniques is that a song can be correctly identified even if it is truncated. Moreover, the technique is well suited for use with streaming media (in which the entire song data is typically not available all at once as a single file).

In database look-up systems employing fingerprints from short excerpts, a first fingerprint may be found to match 10 songs. To resolve this ambiguity, subsequent excerpt-fingerprints can be checked.

One way of making fingerprints "robust" against variations among similar tracks is to employ probabilistic methods using excerpt-based fingerprints. Consider the following, over-simplified, example:

| Fingerprinted excerpt | Matches these songs in database |
|---|---|
| Fingerprint 1 | A, B, C |
| Fingerprint 2 | C, D, E |
| Fingerprint 3 | B, D, F |
| Fingerprint 4 | B, F, G |

This yields a "vote" tally as follows:

| Matches to | A | B | C | D | E | F | G |
|---|---|---|---|---|---|---|---|
| # Hits | 1 | 3 | 2 | 2 | 1 | 2 | 1 |

In this situation, it appears most probable that the fingerprints correspond to song B, since three of the four excerpt-fingerprints support such a conclusion. (Note that he excerpts—that which yielded Fingerprint 2—does not match song B at all.)

More sophisticated probabilistic techniques, of course, can be used.

Once a song has been identified in a database, a number of different responses can be triggered. One is to impose a set of usage controls corresponding to terms set by the copyright holder (e.g., play control limitations, record control, fee charges, etc.) Another is to identify metadata related to the song, and provide the metadata to a user (or a link the metadata). In some such applications, the song is simply identified by title and artist, and this information is returned to the user, e.g., by email, instant messaging, etc. With this information, the user can be given an option to purchase the music in CD or electronic form, purchase related materials (t-shirts, concert tickets), etc. A great variety of other content-triggered actions are disclosed in the cited applications.

One of the advantages of fingerprint-based content identification systems is that not require any alteration to the content. Thus, recordings made 50 years ago can be fingerprinted, and identified through such techniques.

Going forward, there are various advantages to encoding the content with the fingerprint. Thus, for example, a fingerprint identifier derived from a song can be stored in a file header of a file containing that song. (MP3 files, MPEG files, and most other content file formats include header fields in which such information can readily be stored.) The fingerprint can then obtained in two different ways—by reading the info, and by computation from the audio information. This redundancy offers several advantages. One aids security. If a file has a header-stored fingerprint that does not match a fingerprint derived from the file contents, something is amiss—the file may destructive (e.g., a bomb or virus), or the file structure may misidentify the file contents.

In some embodiments, the fingerprint data (or watermark data) stored in the header may be encrypted, and/or authenticated by a digital signature such as a complete hash, or a few check bits or CRC bits. In such cases, the header data can be the primary source of the fingerprint (watermark) information, with the file contents being processed to re-derive the fingerprint (watermark) only if authentication of the fingerprint stored in the header fails. Instead of including the fingerprint in the header, the header can include an electronic address or pointer data indicating another location (e.g., a URL or database record) at which the fingerprint data is stored. Again, this information may be secured using known techniques.

Similarly, the fingerprint can point to a database that contains one or more IDs that are added via a watermark. This is useful when CDs are being converted to MP3 files (i.e. ripped) and the fingerprint is calculated from a hash of the table of contents (TOC) such as done with CDDB.com, or from all of the songs. In this case, the database entry for that fingerprint could include a list of IDs for each song, and these IDs are added via a watermark and/or frame header data. This can also be useful where the content is identified based upon a group of fingerprints from plural excerpts, in which case the database that determines the content also contains an identifier, unrelated to the fingerprint(s) for that piece of content that can be embedded via a watermark.

Instead of, or in addition to, storing a fingerprint in a file header, the fingerprint data may be steganographically encoded into the file contents itself, using known watermarking techniques (e.g., those disclosed in application Ser. No. 09/503,881, and U.S. Pat. Nos. 6,061,793, 6,005,501 and 5,940,135). For example, the fingerprint ID can be duplicated in the data embedded via a watermark.

In some arrangements, a watermark can convey a fingerprint, and auxiliary data as well. The file header can also convey the fingerprint, and the auxiliary data. And even if the file contents are separated from the header, and the watermark is corrupted or otherwise lost, the fingerprint can still be recovered from the content. In some cases, the lost auxiliary data can alternatively be obtained from information in a database record identified by the fingerprint (e.g., the auxiliary information can be literally stored in the record, or the record can point to another source where the information is stored).

Instead of especially processing a content file for the purpose of encoding fingerprint data, this action can be done automatically each time certain applications process the content for other purposes. For example, a rendering application (such as an MP3 player or MPEG viewer), a compression program, an operating system file management program, or other-purposed software, can calculate the fingerprint from the content, and encode the content with that information (e.g., using header data, or digital watermarking). It does this while the file is being processed for another purpose, e.g., taking advantage of the file's copying into a processing system's RAM memory, from slower storage.

In formats in which content is segregated into portions, such as MP3 frames, a fingerprint can be calculated for, and encoded in association with, each portion. Such fingerprints can later be crosschecked against fingerprint data calculated from the content information, e.g., to confirm delivery of paid-for content. Such fingerprints may be encrypted and locked to the content, as contemplated in application Ser. No. 09/620,019.

In addition, in this frame based systems, the fingerprint data and/or watermark data can be embedded with some or all data throughout each frames. This way a streaming system can use the header to first check the song for identification, and if that identification is absent or not authenticated, the system can check for the watermark and/or calculate the fingerprint. This improves the efficiency and cost of the detecting system.

Before being encrypted and digitally signed, the data in the frame header can be modified by the content, possibly a hash of the content or a few critical bits of content. Thus, the frame header data cannot be transferred between content. When reading the data, it must be modified by the inverse transform of the earlier modification. This system can be applied whether the data is embedded throughout each frame or all in a global file header and is discussed in application Ser. No. 09/404,291 entitled "Method And Apparatus For Robust Embedded Data" by Ken Levy on Sep. 23, 1999. Reading this secure header data is only slightly more complex than without the modification, such that the system is more efficient than always having to calculate the fingerprint and/or detect the watermark.

COLLABORATION

In some situations, content may be processed by plural users, at about the same time, to generate corresponding identifiers. This may occur, for example, where the content is a song or advertisement broadcast over the radio. Many listeners in a metropolitan area may process audio from the same song broadcast over the radio, e.g., to learn the artist or song title, to engage in some related e-commerce activity, or for another purpose (such as the other purposes identified in the cited applications).

In such cases it may be desirable to employ collaboration between such users, e.g., to assure more accurate results, to reduce the processing burden, etc.

In one embodiment, each user generates several different fingerprints from the content (such as those identified in the table, above). These fingerprints may be aggregated with other fingerprints submitted from other users within a given time window (e.g., within the past twenty seconds, or within the past fifteen and next five seconds). Since more data is being considered, the "correct" match may more likely stand out from spurious, incorrect matches.

Consider Users 1 and 2, whose content yields fingerprints giving the following matches (User 1 is unchanged from the earlier example):

| Fingerprinted excerpt | Matches these songs in database |
|---|---|
| User 1, Fingerprint N | A, B, C |
| User 1, Fingerprint N + 1 | C, D, E |
| User 1, Fingerprint N + 2 | B, D, F |
| User 1, Fingerprint N + 3 | B, F, G |
| User 2, Fingerprint M | A, B, E |
| User 2, Fingerprint M + 1 | H, I, A |
| User 2, Fingerprint M + 2 | X, Y, Z |

Aggregating the fingerprints from the two users results in an enhanced vote tally in which song B is the evident correct choice—with a higher probability of certainty than in the example earlier given involving a single user:

| Matches to | A | B | C | D | E | F | G | H | I | X | Y | Z |
|---|---|---|---|---|---|---|---|---|---|---|---|---|
| # Hits | 2 | 4 | 2 | 2 | 2 | 2 | 1 | 1 | 1 | 1 | 1 | 1 |

Moreover, note that User 2's results are wholly ambiguous—no song received more than a single candidate match. Only when augmented by consideration of fingerprints from User 1 can a determination for User 2 be made. This collaboration aids the situation where several users are listening to the same content. If two users are listening to different content, it is highly probable that the fingerprints of the two users will be uncorrelated. No benefit arises in this situation, but the collaboration does not work an impairment, either. (In identifying the song for User 1, the system would only check the candidates for whom User 1 voted. Thus, if the above table showed 5 votes for a song J, that large vote count would not be considered in identifying the song for User 1, since none of the fingerprints from User 1 corresponded to that song.)

It will be recognized that the different fingerprints obtained by different users from the same song may be due to a myriad of different factors, such as ambient noise, radio multipath reception, different start times for audio capture, etc.

In the example just given, the number of fingerprints computed for each user can be reduced when compared with non-collaborative approaches, while still providing enhanced confidence in the final song determination.

Another collaborative embodiment employs a reference system. Consider again the example of radio broadcasts in a metropolitan area. Reference receivers can be installed that continuously receive audio from each of several different radio stations. Instead of relying on sound picked up by a microphone from an ambient setting, the reference receivers can generate fingerprint data from the audio in electronic form (e.g., the fingerprint-generation system can be wired to the audio output of the receiver). Without the distortion inherent in rendering through a loudspeaker, sensing through a microphone, and ambient noise effects, more accurate fingerprints may be obtained.

The reference fingerprints can be applied to the database to identify—in essentially real-time and with a high degree of certainty—the songs (or other audio signals) being broadcast by each station. The database can include a set of fingerprints associated with the song. Alternatively, the reference receiver can generate fingerprints corresponding to the identified song.

Consumers listen to audio, and fingerprints are generated therefrom, as before. However, instead of applying the consumer-audio fingerprints to the database (which may involve matching to one of hundreds of thousands of possible songs), the consumer fingerprints are instead compared to the fingerprints generated by the reference receivers (or songs determined there from). The number of such reference fingerprints will be relatively low, related to the number of broadcast stations being monitored. If a consumer-audio fingerprint correlates well with one of the reference fingerprints, then the song corresponding to that reference fingerprint is identified as the song to which the consumer is listening. If the consumer-audio fingerprint does not correlate well with any of the reference fingerprints, then the system may determine that the audio heard by the consumer is not in the subset monitored by the reference receivers, and the consumer-audio fingerprints can thereafter be processed against the full fingerprint database, as earlier described.

The system just described is well suited for applications in which the geographical location of the consumer is known, or can be inferred. For example, if the consumer device that is listening to the audio is a cell phone, and the cellular wireless infrastructure is used to relay data with the phone, the cell system can determine whether the geographical location of the listener (e.g., by area code, cell site, etc.). (Use of such cell-system data to help geographically locate the user can be employed advantageously in several such song-identification systems.).

Even if the consumer's location cannot be determined, the number of songs playing on radio stations nationwide is still a small subset of the total number of possible songs. So a nationwide system, with monitoring stations in many metropolitan areas, can be used to advantage.

As an optional enhancement to such a collaborative system, broadcast signals (e.g., audio signals) are digitally watermarked. The digital watermark preferably contains plural-bit data, which is used to identify the audio signal (e.g., a set of audio fingerprints from the audio signal, song title, copyright, album, artist, and/or record label, etc., etc.). The plural-bit data can either directly or indirectly identify the audio signal. In the indirect case, the plural-bit data includes a unique identifier, which can be used to interrogate a database. The database preferably includes some or all of the identifying information mentioned above. A reference receiver decodes an embedded digital watermark from a received audio signal. The unique identifier is used to interrogate the database to identify a fingerprint or a set of fingerprints associated with the particular audio signal. In some cases, the set includes one fingerprint; in other cases, the set includes a plurality of fingerprints. On the user side, fingerprints are generated and relayed to the reference receiver (or associated interface). The user's fingerprints are then compared against the reference fingerprints, as discussed above in the earlier embodiments.

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference the patents and patent applications cited above. It is applicant's express intention to teach that the methods detailed herein are applicable in connection with the technologies and applications detailed in these cited patents and applications.

Although the foregoing specification has focused on audio applications, it will be recognized that the same principles are likewise applicable with other forms of content, including still imagery, motion pictures, video, etc. References to "songs" are illustrative only, and are not intended to limit the present invention. The inventive methods and systems could also be applied other audio, image, video signals as well. Also, for example, Digimarc MediaBridge linking from objects to corresponding internet resources can be based on identifiers derived from captured image data or the like, rather than from embedded watermarks. As such, the technique is applicable to images and video.

We claim:

1. A method comprising:
   aggregating first fingerprint data and second fingerprint data, wherein fingerprint data comprises at least a reduced-bit representation of content, and wherein the first fingerprint data originated at a first source and the second fingerprint data originated at second source, and wherein the first source and the second source are remotely located;
   identifying information associated with the first fingerprint data and the second fingerprint data; and
   determining a subset of the associated information.

2. The method according to claim 1, wherein said determining is based at least in part on a frequency occurrence of the subset, and wherein the frequency occurrence comprises a vote tally.

3. The method according to claim 1, wherein said determining is based at least in part on a frequency occurrence of the subset, and wherein the subset comprises at least one of audio, video, or image data.

4. The method according to claim 3, wherein the associated information comprises at least one of audio, video or image data.

5. The method of claim 1, wherein said aggregating comprises aggregating fingerprint data within a predetermined time period.

6. The method according to claim 1, wherein the first fingerprint data comprises a first set of audio fingerprints, and wherein the second fingerprint data comprises a second set of audio fingerprints.

7. A method to match a song based on an audio fingerprint, said method comprising:
   aggregating a first set of audio fingerprints provided by a first device with a second set of audio fingerprints provided by a remotely located second device;
   determining a plurality of songs relating to the aggregated fingerprints; and
   selecting a song from the plurality of songs based on a number of times a selected song matches the aggregated fingerprints.

8. The method according to claim 7, wherein the selected song includes the highest number of matches.

9. A method comprising:
   receiving a signal from a first broadcast source at a reference receiver;
   generating first fingerprint data from the received signal;
   applying the first fingerprint data to a database to select associated information;
   receiving second fingerprint data; and
   comparing the second fingerprint data with the associated information.

10. The method according to claim 9, wherein said comparing comprises selecting a subset from the associated information based on a vote tally.

11. A method comprising:
receiving a signal from a first broadcast source at a reference receiver;
generating first fingerprint data from the received signal;
applying the first fingerprint data to a database to select associated information;
receiving second fingerprint data; and
comparing the second fingerprint data with the associated information, wherein said comparing comprises selecting a subset from the associated information based on a vote tally, and wherein the vote tally includes probabilities of a match with the second fingerprint data, and wherein the selected subset has a highest probability of a match.

12. A method comprising:
receiving a signal from a first broadcast source at a reference receiver;
generating first fingerprint data from the received signal;
applying the first fingerprint data to a database to select associated information;
receiving second fingerprint data; and
comparing the second fingerprint data with the associated information, wherein a user device generates the second fingerprint data.

13. A method comprising:
receiving a signal from a first broadcast source at a reference receiver;
generating first fingerprint data from the received signal;
applying the first fingerprint data to a database to select associated information;
receiving second fingerprint data, wherein a cell phone generates the second fingerprint data; and
comparing the second fingerprint data with the associated information.

14. A method comprising:
receiving a signal from a first broadcast source at a reference receiver;
generating first fingerprint data from the received signal;
applying the first fingerprint data to a database to select associated information;
receiving second fingerprint data, wherein a user device generates the second fingerprint data;
comparing the second fingerprint data with the associated information; and
determining a geographical location of the user device.

15. The method according to claim 14, wherein the user device comprises a cell phone, and wherein the geographical location of the user device is determined by at least one of area code, cell site, device identifier, repeater identifier, or alpha-numeric data.

16. A method comprising:
receiving a signal from a first broadcast source at a reference receiver;
generating first fingerprint data from the received signal;
applying the first fingerprint data to a database to select associated information;
receiving second fingerprint data;
comparing the second fingerprint data with the associated information;
receiving a signal from a second broadcast source at the reference receiver;
generating third fingerprint data from the received signal of the second broadcast source; and
applying the third fingerprint data to the database to select associated information.

17. The method according to claim 16, wherein the reference receiver comprises a plurality of receivers.

18. The method according to claim 17, wherein at least a first receiver of the plurality of receivers and a second receiver of the plurality of receivers are located in different geographical locations.

19. The method according to claim 9, wherein when a comparison of the second fingerprint data with the associated information does not identify a subset of the associated data, said method further comprises querying a second database to determine additional associated information.

20. A method comprising:
receiving a signal front a first broadcast source at a reference receiver, the signal comprising an embedded digital watermark;
decoding the digital watermark to obtain a plural-bit identifier;
interrogating a database with the identifier to identify a set of fingerprints associated with the received signal;
receiving second fingerprint data; and
comparing the second fingerprint data with the set of fingerprints.

21. The method according to claim 20, wherein said comparing comprises selecting a subset from the set of fingerprints based on a vote tally.

22. A method comprising:
cumulating a first set of representations of audio or video with a second set of representations of audio or video, wherein the representations comprise reduced-bit representations of audio or video, and wherein the first set of representations are provided from a first device and the second set of representations are provided from a second device;
determining a plurality of audio and video content relating to the cumulated sets; and
selecting a set of audio or video content from the plurality of audio or video content based on a number of times a selected set of audio and video content corresponds with the cumulated sets.

23. A method comprising:
receiving content, wherein the content comprises an embedded digital watermark;
decoding the digital watermark to obtain a plural-bit identifier;
deriving a reduced-bit representation of the content;
accessing a database with at least the plural-bit identifier; and
using at least the reduced-bit representation of the content to help identify or authenticate the content.

* * * * *